US011906920B2

(12) United States Patent
Yoshida et al.

(10) Patent No.: US 11,906,920 B2
(45) Date of Patent: Feb. 20, 2024

(54) IMAGE FORMING APPARATUS

(71) Applicant: TOSHIBA TEC KABUSHIKI KAISHA, Tokyo (JP)

(72) Inventors: Masafumi Yoshida, Sunto Shizuoka (JP); Takashi Ogiwara, Numazu Shizuoka (JP); Kazuyoshi Takeshita, Fujinomiya Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/691,068

(22) Filed: Mar. 9, 2022

(65) Prior Publication Data

US 2023/0288860 A1 Sep. 14, 2023

(51) Int. Cl.
*G03G 15/00* (2006.01)
*G03G 15/20* (2006.01)

(52) U.S. Cl.
CPC ..... *G03G 15/5045* (2013.01); *G03G 15/2017* (2013.01); *G03G 15/2039* (2013.01)

(58) Field of Classification Search
CPC ........... G03G 15/2039; G03G 15/2017; G03G 15/5045
See application file for complete search history.

(56) References Cited

U.S. PATENT DOCUMENTS

| | | | | |
|---|---|---|---|---|
| 9,285,767 | B2 * | 3/2016 | Seong | G03G 21/203 |
| 2011/0280600 | A1 * | 11/2011 | Suzuki | G03G 15/1675 399/66 |
| 2016/0274522 | A1 | 9/2016 | Yamamoto et al. | |

FOREIGN PATENT DOCUMENTS

| | | |
|---|---|---|
| JP | 2007-199642 A | 8/2007 |
| JP | 2007-286579 A | 11/2007 |
| JP | 2021-071619 A | 5/2021 |

* cited by examiner

*Primary Examiner* — Stephanie E Bloss
*Assistant Examiner* — Michael A Harrison
(74) *Attorney, Agent, or Firm* — FOLEY & LARDNER LLP

(57) ABSTRACT

An image forming apparatus includes an image forming unit, a fixer, first and second temperature sensors, and storage and control units. The fixer fixes an image formed on the sheet by pressing. The first temperature sensor is disposed away from the image forming unit and the fixer, and measures an ambient temperature. The second temperature sensor is disposed closer to the image forming unit than the first temperature sensor, and measures an ambient temperature. The storage unit stores one or more difference values between first and second temperatures measured by the first and second temperature sensors when a switching condition is satisfied. When a difference between the one or more difference values in the storage unit and a latest difference value is equal to or larger than a threshold, the control unit stores information indicating that a reference value for determining an abnormality is exceeded.

18 Claims, 7 Drawing Sheets

FIG. 3

| INTERMITTENT PRINTING TRANSITION TIME | PAPER FEEDING COUNTER | FIRST TEMPERATURE T1 | SECOND TEMPERATURE T2 | DIFFERENCE VALUE Δt |
|---|---|---|---|---|
| 20XX/MM/DD 13:00:00 | 1000 | 31 | 43 | 12 |
| 20XX/MM/DD 13:00:10 | 1100 | 31 | 44 | 13 |
| 20XX/MM/DD 13:00:20 | 1200 | 32 | 46 | 14 |
| 20XX/MM/DD 13:00:30 | 1300 | 31 | 43 | 12 |
| 20XX/MM/DD 13:00:40 | 1400 | 33 | 45 | 12 |
| 20XX/MM/DD 13:01:00 | 1500 | 32 | 43 | 11 |
| 20XX/MM/DD 13:03:00 | 1600 | 31 | 43 | 12 |
| 20XX/MM/DD 13:05:00 | 1700 | 32 | 44 | 12 |
| 20XX/MM/DD 13:06:00 | 1800 | 31 | 43 | 12 |
| 20XX/MM/DD 14:00:00 | 1900 | 31 | 42 | 11 |
| 20XX/MM/DD 15:00:00 | 2000 | 31 | 54 | 23 |

IMAGE FORMING APPARATUS

FIELD

Embodiments described herein relate generally to an image forming apparatus.

BACKGROUND

In recent years, with an increase in an image forming speed of an image forming apparatus and a decrease in a melting point of toner, energy loss due to an increase in a driving speed of toner stirring in a developing device, and a value of a temperature increase due to frictional heat generated when a developer of a developing sleeve is scraped off, are also increased. When toner used in an image forming apparatus is affected by heat, toners stick together and are adhered. When printing is performed in the image forming apparatus with the toner adhered, the adhered toner is stuck in a doctor blade of the developing device and appears as a blank spot image or a white dot image.

DESCRIPTION OF THE DRAWINGS

FIG. 3 is a diagram showing a specific example of a temperature information table according to at least one embodiment;

DETAILED DESCRIPTION

In order to solve problems as described above, it is necessary to prevent a temperature increase of the doctor blade. In the related art, as a method of preventing a temperature increase of the doctor blade, control is performed to switch to intermittent printing in which printing and printing stop are repeated when a temperature inside the image forming apparatus is high during printing. By switching to intermittent printing, the temperature inside the image forming apparatus can be kept constant. However, the temperature increase due to a failure or an abnormality of the image forming apparatus may not be prevented, and a failure of the apparatus may occur if such a state continues. The present disclosure addresses these and other issues.

In general, according to at least one embodiment, an image forming apparatus includes an image forming unit (image former), a fixing unit (fixer), a first temperature sensor, a second temperature sensor, a storage unit (storage), and a control unit (controller). The image forming unit forms an image on a sheet. The fixing unit fixes the image formed on the sheet by pressing the image. The first temperature sensor is disposed in a place away from the image forming unit and the fixing unit, and measures an ambient temperature. The second temperature sensor is disposed in a place closer to the image forming unit than the first temperature sensor, and measures an ambient temperature. The storage unit stores one or more difference values each being a difference value between a first temperature measured by the first temperature sensor and a second temperature measured by the second temperature sensor when a switching condition for switching to an intermittent mode for intermittent printing in which printing stop and printing are repeated is satisfied. When a difference between each of the one or more difference values stored in the storage unit and a latest difference value obtained when the switching condition is newly satisfied is equal to or larger than a threshold, the control unit stores information indicating that a reference value for determining an abnormality is exceeded.

Hereinafter, an image forming apparatus according to at least one embodiment will be described with reference to the drawings.

Figure 1:
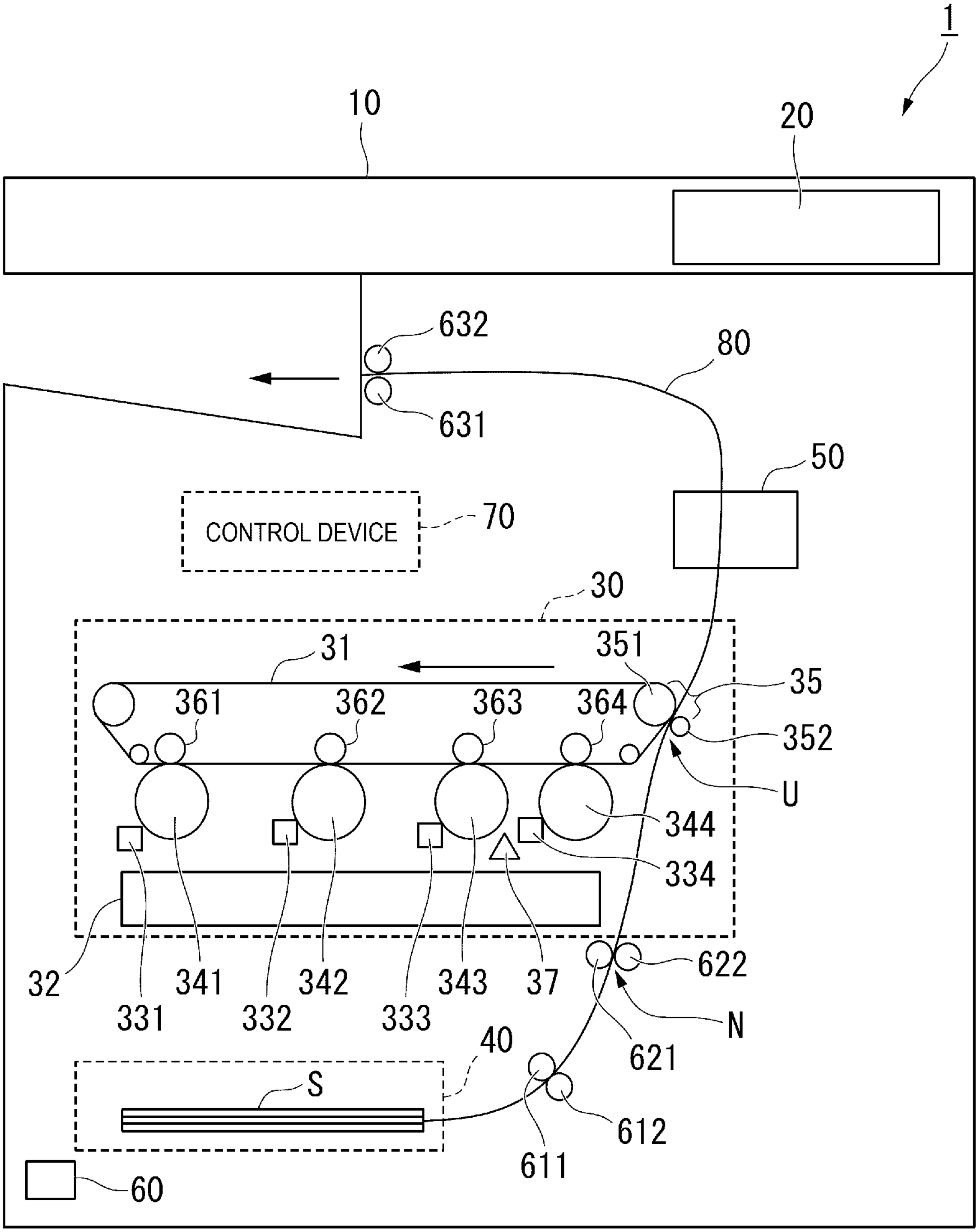
FIG. 1 is an external view showing an example of an overall configuration of an image forming apparatus according to at least one embodiment.

FIG. 1 is an external view illustrating an example of an overall configuration of the image forming apparatus according to at least one embodiment. An image forming apparatus 1 according to at least one embodiment is a multifunction peripheral (MFP). The image forming apparatus 1 performs printing which is based on image forming and image fixing. The image forming is a process of forming an image on a sheet. The image fixing is a process of fixing the image formed on the sheet. The sheet is, for example, paper on which characters, images, and the like are formed. The sheet may be any material as long as the image forming apparatus 1 can form an image thereon.

The image forming apparatus 1 includes an image reading unit 10, a control panel 20, an image forming unit 30, a sheet storage unit 40, a fixing unit 50, a first temperature sensor 60, conveying rollers 611 and 612, registration rollers 621 and 622, sheet discharge rollers 631 and 632, and a control device 70.

The image reading unit 10 reads an image, which is to be read, on a document based on brightness and darkness of light. For example, the image reading unit 10 reads an image printed on a document which is to be read and set on a document reading platen. The image reading unit 10 records the read image information. The recorded image information may be transmitted to another information processing apparatus via a network. The recorded image information may be image-formed on a sheet by the image forming unit 30.

The control panel 20 includes a display unit (display) and an operation unit. The display unit is a display device such as a liquid crystal display, an organic electro luminescence (EL) display, and the like. The display unit displays various types of information related to the image forming apparatus 1 under control of the control device 70. The operation unit includes a plurality of buttons and the like. The operation unit receives an operation from a user. For example, the operation unit receives an input instruction of a sheet type and a print instruction. The operation unit outputs, to the control device 70, a signal corresponding to an operation performed by the user. The display unit and the operation unit may be configured as an integrated touch panel.

The image forming unit 30 performs the image forming. Specifically, the image forming unit 30 forms, on a sheet, an image based on the image information generated by the image reading unit 10 or image information received via a communication path. For example, the image forming unit 30 forms a toner image on a sheet with toner.

The image forming unit 30 includes a transfer belt 31, an exposure unit 32, a plurality of developing devices 331 to 334, a plurality of photosensitive drums 341 to 344, a transfer unit 35, a plurality of primary transfer rollers 361 to 364, and a second temperature sensor 37.

The transfer belt 31 is an endless intermediate transfer member. The transfer belt 31 is rotated counterclockwise due to rotation of the rollers.

The exposure unit 32 is provided at a position facing the photosensitive drums 341 to 344 between the developing devices 331 to 334 and chargers. The exposure unit 32 irradiates surfaces (photosensitive layers) of the photosensitive drums 341 to 344 with a laser beam based on the image information. A direction in which the laser beam scans the photosensitive drums is a main scanning direction, and a direction orthogonal to the main scanning direction is a sub-scanning direction.

By the irradiation of the laser beam, charges on the surfaces (photosensitive layers) of the photosensitive drums 341 to 344 disappear. As a result, electrostatic patterns are formed on the surfaces of the photosensitive drums 341 to 344 at positions irradiated with the laser beam. That is, an electrostatic latent image is formed on the surfaces of the photosensitive drums 341 to 344 by the irradiation of the laser beam by the exposure unit 32. The exposure unit 32 may use light emitting diode (LED) light instead of the laser beam. Light emission of the exposure unit 32 is controlled based on the image information under the control of the control device 70.

The developing devices 331 to 334 supply the toner to the photosensitive drums 341 to 344. For example, the developing device 331 develops an electrostatic latent image on the surface of the photosensitive drum 341 with yellow (Y) toner. The developing device 332 develops an electrostatic latent image on the surface of the photosensitive drum 342 with magenta (M) toner. The developing device 333 develops an electrostatic latent image on the surface of the photosensitive drum 343 with cyan (C) toner. The developing device 334 develops an electrostatic latent image on the surface of the photosensitive drum 344 with black (K) toner.

The developing devices 331 to 334 form toner images as visible images on the photosensitive drums 341 to 344. The toner images formed on the photosensitive drums 341 to 344 are transferred (primarily-transferred) onto the transfer belt 31 by the primary transfer rollers 361 to 364. The primary transfer roller 361 is provided at a position facing the photosensitive drum 341 with the transfer belt 31 interposed therebetween. The primary transfer roller 362 is provided at a position facing the photosensitive drum 342 with the transfer belt 31 interposed therebetween. The primary transfer roller 363 is provided at a position facing the photosensitive drum 343 with the transfer belt 31 interposed therebetween. The primary transfer roller 364 is provided at a position facing the photosensitive drum 344 with the transfer belt 31 interposed therebetween.

The transfer unit 35 includes a support roller 351 and a secondary transfer roller 352. The transfer unit 35 transfers the toner image on the transfer belt 31 to a sheet at a secondary transfer position U. The secondary transfer position U is a position where the support roller 351 and the secondary transfer roller 352 face each other with the transfer belt 31 interposed therebetween. The transfer unit 35 applies a transfer bias controlled by a transfer current to the transfer belt 31. The transfer unit 35 transfers the toner image on the transfer belt 31 to a sheet by the transfer bias. The transfer current is controlled by the control device 70.

The second temperature sensor 37 is disposed in the vicinity of the photosensitive drum 344. The second temperature sensor 37 measures a temperature inside the image forming apparatus 1. More specifically, the second temperature sensor 37 measures a temperature in the vicinity of the photosensitive drum 344 as the temperature inside the image forming apparatus 1. The second temperature sensor 37 is, for example, a thermistor. The second temperature sensor 37 outputs, to the control device 70, information on the measured temperature in the vicinity of the photosensitive drum 344 as second temperature information.

The environment in which the second temperature sensor 37 is disposed is more easily affected by heat than the environment in which the first temperature sensor 60 is disposed. Therefore, in general, the temperature measured by the second temperature sensor 37 is higher than the temperature measured by the first temperature sensor 60. Hereinafter, the temperature measured by the second temperature sensor 37 is referred to as a second temperature T2.

The sheet storage unit 40 includes one or more paper feeding cassettes. Each of the paper feeding cassettes stores sheets S of a predetermined size and a predetermined type. The sheets S of predetermined types refer to sheets having different thicknesses. Examples of the sheets S of predetermined types include plain paper and thick paper. The sheet storage unit 40 may store sheets of other types in addition to the plain paper and the thick paper as long as the sheets have a different thicknesses. The paper feeding cassette includes paper feeding rollers. The paper feeding rollers take out the sheets S one by one from the paper feeding cassette. The paper feeding rollers supply the taken out sheet S to a conveying unit (conveyor) 80.

The fixing unit (fixer) 50 performs the image fixing. Specifically, the fixing unit 50 fixes an image (for example, a toner image) formed on the sheet S on the sheet S by applying heat and pressure to the sheet S.

The first temperature sensor 60 is disposed in a place different from the place where the second temperature sensor 37 is disposed, and is disposed in a place in a housing of the image forming apparatus 1 where influence of heat is less than that of the second temperature sensor 37. The place in the housing of the image forming apparatus 1 where the influence of heat is less than that of the second temperature sensor 37 is a place farther from the place where the fixing unit 50 is disposed than the second temperature sensor 37. The vicinity of the sheet storage unit 40 is an example of the place in the housing of the image forming apparatus 1 where the influence of heat is less than that of the second temperature sensor 37. In this example, the first temperature sensor 60 is disposed in the vicinity of the sheet storage unit 40, and the first temperature sensor 60 may be disposed in another place as long as the above-mentioned condition is satisfied.

The first temperature sensor 60 measures a temperature inside the image forming apparatus 1. More specifically, the first temperature sensor 60 measures a temperature around the place where the first temperature sensor 60 is disposed as the temperature inside the image forming apparatus 1. The first temperature sensor 60 is, for example, a temperature and humidity sensor (e.g., an integrated temperature and humidity sensor). The first temperature sensor 60 outputs, to the control device 70, information on the measured temperature around the place where the first temperature sensor 60 is disposed as first temperature information. Hereinafter, the temperature measured by the first temperature sensor 60 is referred to as a first temperature T1.

The conveying rollers 611 and 612 convey the sheet S fed from the paper feeding cassette to a downstream side. For example, the conveying rollers 611 and 612 convey the sheet S to the registration rollers 621 and 622. The downstream side is a direction in which the sheet S is conveyed. For example, the downstream side is a direction toward the sheet discharge rollers 631 and 632 with the positions of the conveying rollers 611 and 612 as a reference. The conveying rollers 611 and 612 are disposed at positions facing each other. The conveying rollers 611 and 612 are driven to rotate under the control of the control device 70.

The registration rollers 621 and 622 convey the sheet S to the downstream side according to a timing at which the transfer unit 35 transfers the toner image on a surface of the sheet S. The registration rollers 621 and 622 align a leading edge of the sheet S fed by the conveying rollers 611 and 612 at a nip N, and then convey the sheet S to the downstream side. As described above, the registration rollers 621 and 622 are used to align the sheet S when the leading edge of the conveyed sheet S abuts against the registration rollers 621 and 622. The registration rollers 621 and 622 are provided downstream of a first sensor 65 and a second sensor 66. The registration rollers 621 and 622 are driven to rotate under the control of the control device 70.

The sheet discharge rollers 631 and 632 discharge the sheet S on which the image is fixed by the fixing unit 50 to a discharge unit. The sheet discharge rollers 631 and 632 are disposed at positions facing each other. The sheet discharge rollers 631 and 632 are driven to rotate under the control of the control device 70.

The control device 70 controls each functional unit of the image forming apparatus 1.

The conveying unit 80 conveys the sheet S. The conveying unit 80 is a conveying path for conveying the sheet S.

Figure 2:
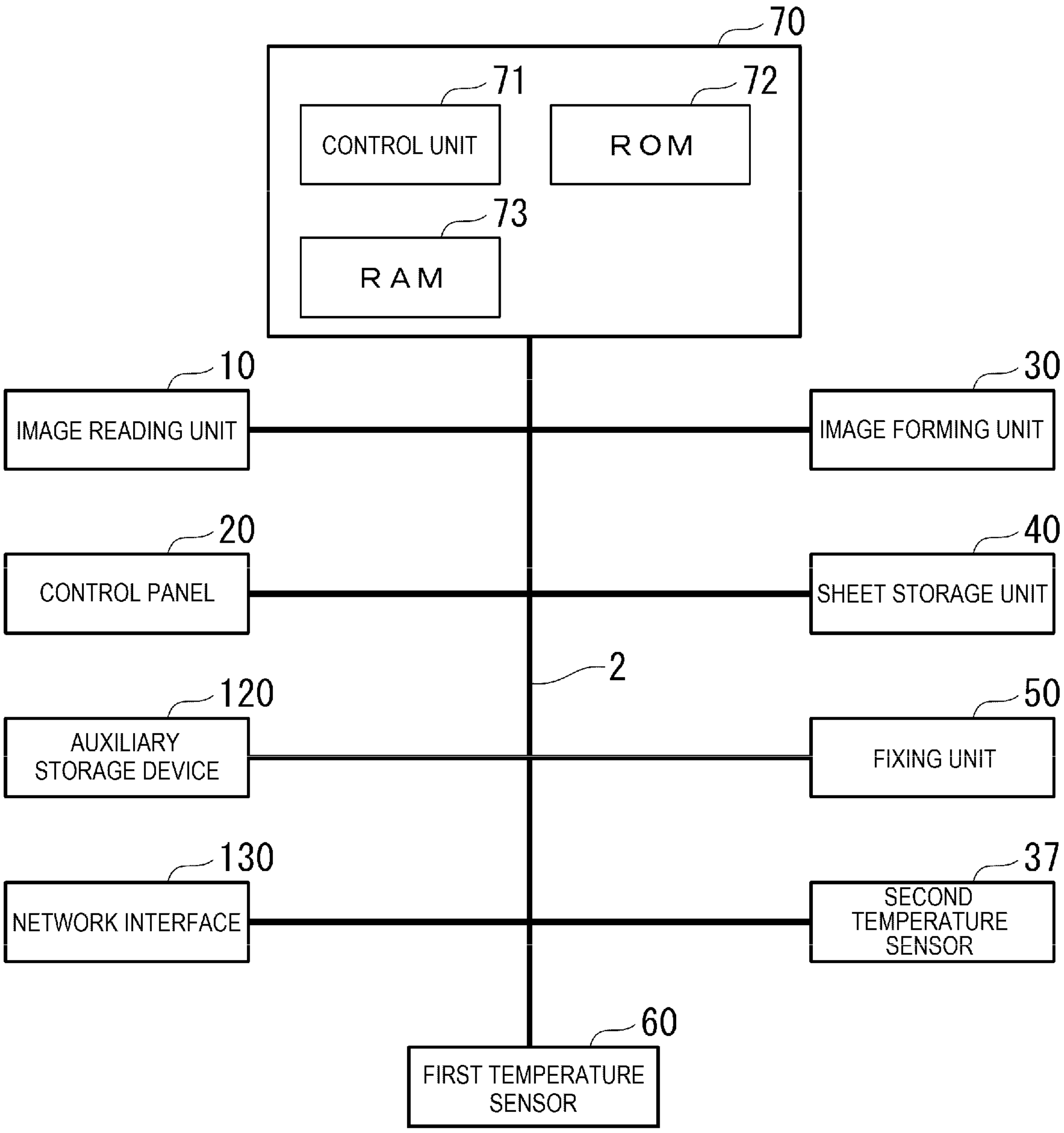
FIG. 2 is a block diagram showing a hardware configuration of the image forming apparatus.

FIG. 2 is a block diagram showing a hardware configuration of the image forming apparatus 1 in the embodiment. FIG. 2 shows a part of the hardware configuration. The image forming apparatus 1 includes the image reading unit 10, the control panel 20, the image forming unit 30, the second temperature sensor 37, the sheet storage unit 40, the fixing unit 50, the first temperature sensor 60, the control device 70, an auxiliary storage device 120, and a network interface 130 (communication interface). The functional units are connected via a system bus 2 such that data communication can be performed.

In the image forming apparatus 1, the image reading unit 10, the control panel 20, the image forming unit 30, the second temperature sensor 37, the sheet storage unit 40, the fixing unit 50, and the first temperature sensor 60 are the same as those described above, and thus the description thereof is omitted. Hereinafter, the control device 70, the auxiliary storage device 120, and the network interface 130 will be described.

The control device 70 includes a control unit 71, a read only memory (ROM) 72, and a random access memory (RAM) 73. The control unit 71 is, for example, a processor such as a central processing unit (CPU) or a graphics processing unit (GPU). The control unit 71 controls an operation of each functional unit of the image forming apparatus 1. The control unit 71 executes various processes by loading a program stored in the ROM 72 into the RAM 73 and executing the program. An application specific integrated circuit (ASIC) may have an appropriate function implemented by the control unit 71. The ASIC is a dedicated circuit for implementing a specific function.

The control unit 71 causes the image forming apparatus 1 to perform the image forming and the image fixing by switching a mode of the image forming apparatus 1 between a normal mode and an intermittent mode. The normal mode is a mode in which printing based on the image forming and the image fixing is continuously performed in response to the print instruction. More specifically, unlike the intermittent mode, the normal mode is a mode in which a requested job is executed without being stopped. The term "without being stopped" here excludes abnormal situations such as a failure or toner running out.

The intermittent mode is a mode in which printing based on the image forming and the image fixing and printing stop are repeatedly performed. When the first temperature T1 is equal to or higher than a first comparison temperature θ and the second temperature T2 is equal to or higher than a second comparison temperature α, the control unit 71 switches the mode of the image forming apparatus 1 to the intermittent mode. The first comparison temperature θ is a preset temperature for comparison with the first temperature T1. For example, the first comparison temperature θ is 31° C. The second comparison temperature α is a preset temperature for comparison with the second temperature T2. For example, the second comparison temperature α is 43° C.

When the mode of the image forming apparatus 1 is switched to the intermittent mode, the control unit 71 stores the first temperature T1 and the second temperature T2 acquired at that time in the auxiliary storage device 120 in association with time information. The control unit 71 calculates an absolute value Δt of a difference (hereinafter, simply referred to as a "difference value") between the first temperature T1 and the second temperature T2, and stores the difference value Δt in the auxiliary storage device 120 in association with the first temperature T1 and the second temperature T2. The first temperature T1 and the second temperature T2 acquired at that time are used when the control unit 71 determines to switch the mode of the image forming apparatus 1 to the intermittent mode.

When a difference between each of one or more difference values obtained in the past and a latest difference value is equal to or larger than a threshold, the control unit 71 notifies service personnel. The threshold to be compared with the difference between each of the one or more difference values obtained in the past and the latest difference value is a reference value for determining an abnormality, and is, for example, 10° C. The one or more difference values obtained in the past are stored in the auxiliary storage device 120 before the latest difference value is obtained. Hereinafter, the difference value obtained in the past will be referred to as a past difference value.

When one past difference value is used as the one or more difference values, the control unit 71 may use a difference value immediately before the latest difference value. When a plurality of past difference values (for example, 10 past difference values) are used as the one or more past difference values, the control unit 71 may use a statistical value of the plurality of past difference values. For example, the control unit 71 may use an average value or a median value of the plurality of past difference values.

In the following description, an abnormality notification condition is satisfied when the difference between each of the one or more difference values obtained in the past and the latest difference value is equal to or larger than a threshold, and the abnormality notification condition is not satisfied when the difference between each of the one or more difference values obtained in the past and the latest difference value is less than the threshold. The abnormality notification condition is a condition for notifying the service personnel that an abnormality occurred or that an abnormality may occur.

Since the temperature in the apparatus does not exceed a certain value when printing is continued in the intermittent mode, the difference value Δt when transiting to intermittent printing does not greatly vary from the past difference value Δt and is always close to the past difference value Δt (e.g., a present difference value Δt is within a predetermined distance from the prior difference value Δt). The first temperature T1 may change depending on the outside air temperature or the like, and even in consideration of the temperature change, it is normal that an amount of change between the latest difference value Δt and the past difference value Δt when transiting to the intermittent mode is within about ±5° C., for example. However, when the latest difference value Δt when transitioning to the intermittent mode suddenly increases with respect to the past difference value Δt, a failure of the thermistor, a failure of the developing device, or the like may occur. When a failure occurs in the developing device, an image abnormality such as a blank spot may occur. A failure may occur if paper feeding is continued. Therefore, when the difference between each of the one or more past difference values and the latest past difference value is equal to or larger than the threshold, the control unit 71 notifies the service personnel.

The ROM 72 stores a program for operating the control unit 71. The RAM 73 temporarily stores data used by each functional unit provided in the image forming apparatus 1. The RAM 73 may store digital data generated by the image reading unit 10. The RAM 73 may temporarily store a job and a job log.

The auxiliary storage device 120 is, for example, a hard disk or a solid state drive (SSD), and stores various types of data. The various types of data include, for example, digital data, a job, a job log, and a temperature information table.

The temperature information table is a table in which information related to temperature information such as the first temperature T1 and the second temperature T2 when transiting to the intermittent mode is registered. FIG. 3 is a diagram showing a specific example of the temperature information table in at least one embodiment. In the temperature information table, information on an intermittent printing transition time, a paper feeding counter, the first temperature T1, the second temperature T2, and the difference value is associated. In the temperature information table, it is sufficient that at least information on the first temperature T1, the second temperature T2, and the difference value is associated.

The intermittent printing transition time represents a time at which the image forming apparatus 1 transits to the intermittent mode. The paper feeding counter represents the number of sheets S printed by the image forming apparatus 1. The first temperature T1 represents a temperature measured by the first temperature sensor 60. The second temperature T2 represents a temperature measured by the second temperature sensor 37. The difference value represents a difference value between the first temperature T1 and the second temperature T2. The difference value is represented by an absolute value.

As shown in FIG. 3, information related to the temperature information is registered in chronological order in the temperature information table. An upper limit of the number of pieces of information registered in the temperature information table may be fixed.

The network interface 130 transmits data to and receives data from other devices. The other devices include, for example, an information processing apparatus such as a personal computer. The network interface 130 operates as an input interface and receives data or instructions transmitted from other devices. The instructions transmitted from other devices include an instruction for printing. The network interface 130 operates as an output interface and transmits, to other devices, data and notifications to service personnel.

Figure 4:
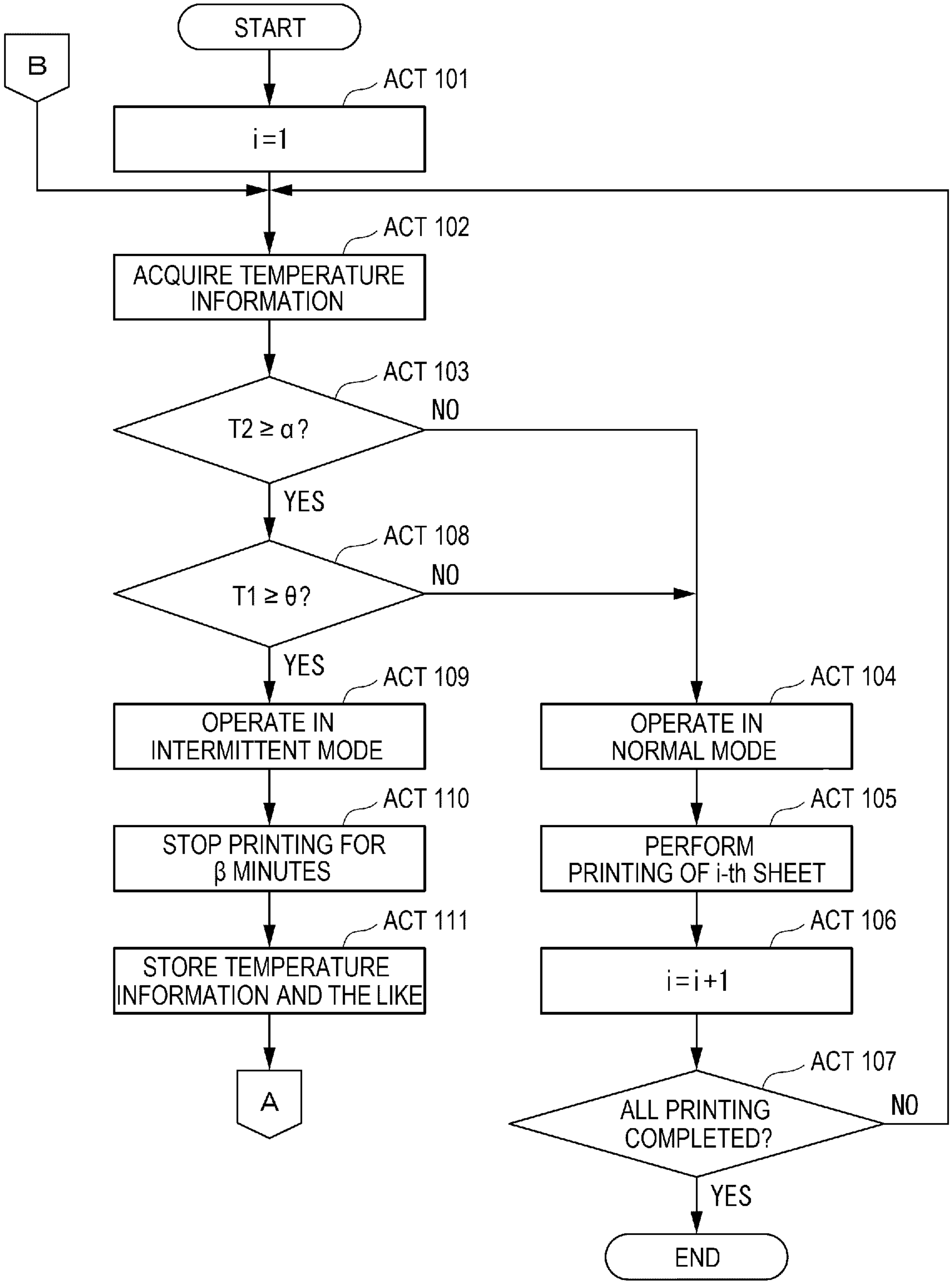
FIG. 4 is a flowchart showing a flow of a process performed by the image forming apparatus.
Figure 5:
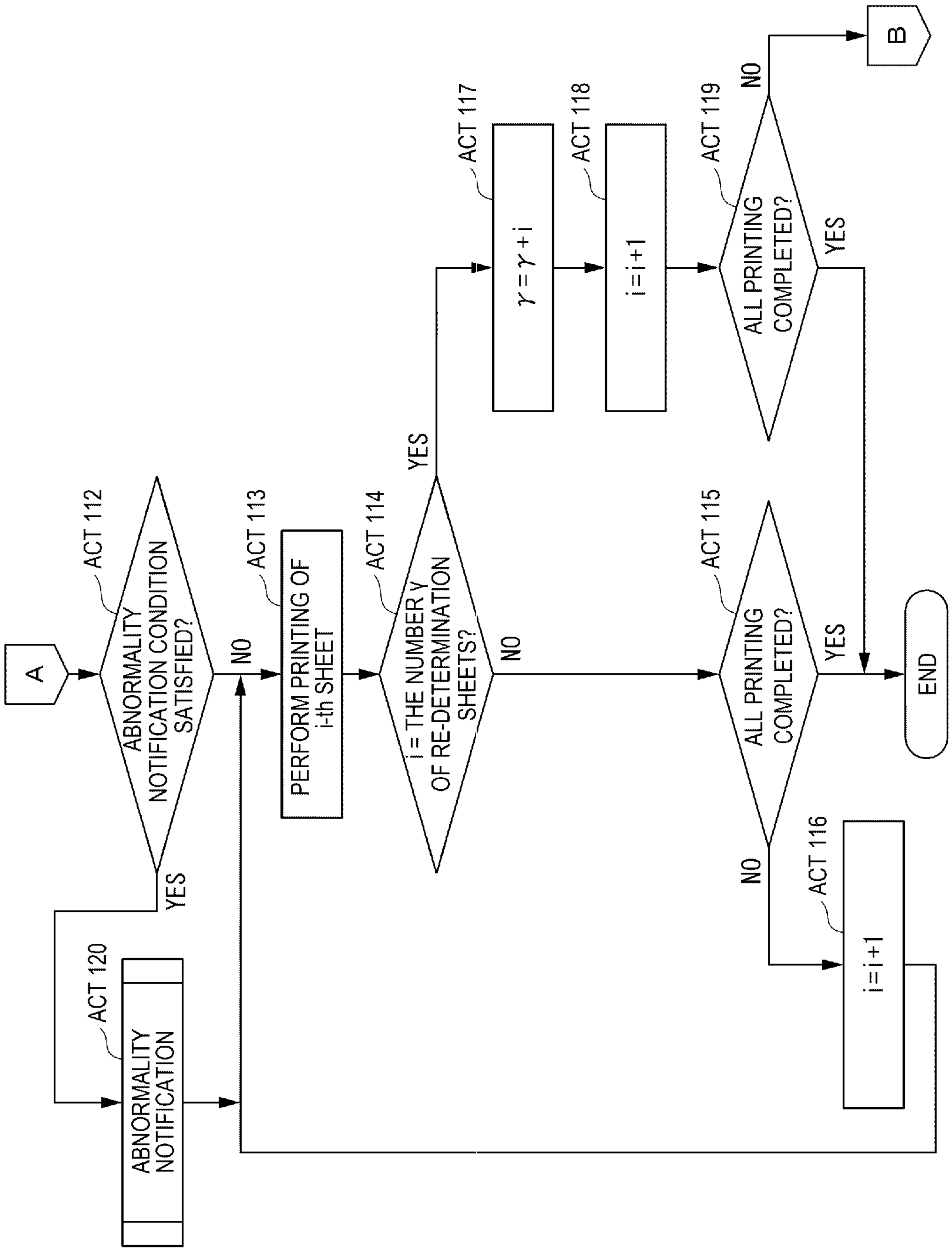
FIG. 5 is a flowchart showing a flow of a process performed by the image forming apparatus.

FIGS. 4 and 5 are flowcharts showing flows of processes performed by the image forming apparatus 1 in the embodiment. The processes of FIG. 4 and FIG. 5 are executed when a print instruction is given.

The control unit 71 sets the number i of sheets to be printed to 1 as a count value of the number of sheets to be printed (ACT 101). The control unit 71 acquires the first temperature information from the first temperature sensor 60 and acquires the second temperature information from the second temperature sensor 37 (ACT 102).

The control unit 71 compares the second temperature T2 indicated by the acquired second temperature information with the second comparison temperature α (for example, 43° C.) The control unit 71 determines whether the second temperature T2 is equal to or higher than the second comparison temperature α (ACT 103). When the control unit 71 determines that the second temperature T2 is lower than the second comparison temperature α (ACT 103: NO), the control unit 71 causes the image forming apparatus 1 to operate in the normal mode (ACT 104). The control unit 71 performs printing of an i-th sheet (ACT 105). After the printing of the i-th sheet is completed, the control unit 71 adds 1 to the count value of the number i of sheets to be printed (ACT 106).

The control unit 71 determines whether all printing is completed (ACT 107). All printing means printing of all requested data. When printing of all the requested data is completed, the control unit 71 determines that all printing is completed. On the other hand, when printing of all the requested data is not completed, the control unit 71 determines that all printing is not completed.

When the control unit 71 determines that all printing is completed (ACT 107: YES), the control unit 71 ends the processes shown in FIGS. 4 and 5. When the control unit 71 determines that all printing is not completed (ACT 107: NO), the control unit 71 executes the process of ACT 102 and the subsequent processes. In the process of ACT 103, when the control unit 71 determines that the second temperature T2 is equal to or higher than the second comparison temperature α (ACT 103: YES), the control unit 71 compares the first temperature T1 indicated by the acquired first temperature information with the first comparison temperature θ. The control unit 71 determines whether the first temperature T1 is equal to or higher than the first comparison temperature θ (ACT 108).

When the control unit 71 determines that the first temperature T1 is lower than the first comparison temperature θ (ACT 108: NO), the control unit 71 executes the process of ACT 104 and the subsequent processes. When the control unit 71 determines that the first temperature T1 is equal to or higher than the first comparison temperature θ (ACT 108: YES), the control unit 71 causes the image forming apparatus 1 to operate in the intermittent mode (ACT 109). Thereafter, the image forming apparatus 1 stops the printing for a stop time of β minutes (for example, 1 minute) (ACT 110).

Specifically, the control unit 71 stops the various rollers from the time when the image forming apparatus 1 operates in the intermittent mode to when a stop time of β minutes elapsed. The control unit 71 stops the operations of the image forming unit 30 and the fixing unit 50 from the time when the image forming apparatus 1 operates in the intermittent mode to when the stop time of β minutes elapsed. For example, the control unit 71 may stop the operations of the image forming unit 30 and the fixing unit 50 by stopping power supply to the image forming unit 30 and the fixing unit 50.

The control unit 71 calculates the difference value Δt which is the absolute value of the difference between the first temperature T1 and the second temperature T2 obtained in the process of ACT 102. The control unit 71 stores the first temperature T1, the second temperature T2, and the difference value Δt in the temperature information table in association with the time information (ACT 111). The control unit 71 determines whether the abnormality notification condition is satisfied based on the temperature information table (ACT 112).

When the control unit 71 determines that the abnormality notification condition is not satisfied (ACT 112: NO), the control unit 71 performs printing of the i-th sheet after the stop time of β minutes elapsed (ACT 113). The control unit 71 compares the number i of sheets to be printed with the number γ of re-determination sheets, and determines whether the number i of sheets to be printed is equal to the number γ of re-determination sheets (ACT 114). The number γ of re-determination sheets is a reference value for determining whether to stop the printing again, and is, for example, 40 sheets. For example, when the number γ of re-determination sheets is 40 sheets, the image forming apparatus 1 stops the printing for the stop time of β minutes every time 40 sheets are continuously printed in the intermittent mode.

The continuous printing in at least one embodiment does not need to be printing of a plurality of sheets according to one print instruction. For example, the continuous printing in at least one embodiment may be printing of a plurality of sheets according to a plurality of print instructions. In this case, when another print instruction is received, while printing based on one print instruction is performed, the image forming apparatus 1 also counts printing based on the another print instruction as printing based on one print instruction.

When the control unit 71 determines that the number i of sheets to be printed is not equal to the number γ of re-determination sheets (ACT 114: NO), the control unit 71 determines whether all printing is completed (ACT 115). When the control unit 71 determines that all printing is completed (ACT 115: YES), the control unit 71 ends the processes shown in FIGS. 4 and 5.

On the other hand, when the control unit 71 determines that all printing is not completed (ACT 115: NO), the control unit 71 adds 1 to the count value of the number i of sheets to be printed (ACT 116). The image forming apparatus 1 executes the process of ACT 113 and the subsequent processes.

In the process of ACT 114, when the control unit 71 determines that the number i of sheets to be printed is equal to the number γ of re-determination sheets (ACT 114: YES), the control unit 71 sets, as a new number γ of re-determination sheets, a value obtained by adding the count value of the current number i of sheets to be printed to the number γ of re-determination sheets (ACT 117). For example, when the number γ of re-determination sheets is 40 and the number i of sheets to be printed is 40, the control unit 71 sets the new number γ of re-determination sheets to 80. The control unit 71 adds 1 to the count value of the number i of sheets to be printed (ACT 118).

The control unit 71 determines whether all printing is completed (ACT 119). When the control unit 71 determines that all printing is completed (ACT 119: YES), the control unit 71 ends the processes shown in FIGS. 4 and 5. On the other hand, when the control unit 71 determines that all printing is not completed (ACT 115: NO), the control unit 71 performs the process of ACT 102 and the subsequent processes. As described above, when the number i of sheets to be printed in printing of one time reaches the number γ of re-determination sheets, the image forming apparatus 1 acquires the temperature information again and controls an operation mode.

In the process of ACT 112, when the control unit 71 determines that the abnormality notification condition is satisfied (ACT 112: YES), the control unit 71 performs abnormality notification. The abnormality notification will be described with reference to FIGS. 6 and 7. After the abnormality notification, the image forming apparatus 1 performs the process of ACT 113 and the subsequent processes.

Figure 6:
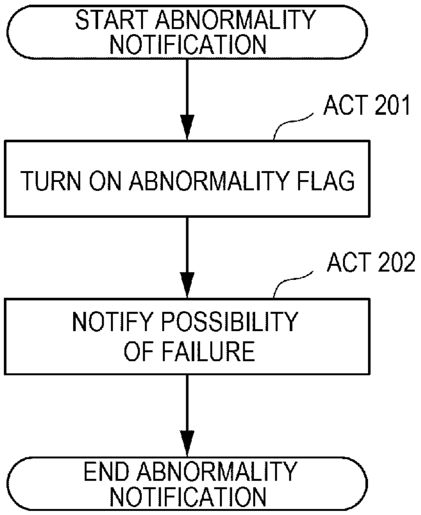
FIG. 6 is a flowchart showing a flow of abnormality notification (part 1) performed by the image forming apparatus.

FIG. 6 is a flowchart showing a flow of abnormality notification (part 1) performed by the image forming apparatus 1 in the embodiment.

The control unit 71 turns on an abnormality flag (ACT 201). The abnormality flag is information indicating that the reference value for determining an abnormality is exceeded. When the abnormality flag is set, the control unit 71 notifies the service personnel a possibility of failure via the network interface 130 (ACT 202). That is, when the abnormality flag is set, the control unit 71 notifies an external device operated by the service personnel the possibility of failure via the network interface 130. Since the image forming apparatus 1 cannot identify the cause of the failure when executing the process of FIG. 6, the image forming apparatus 1 continues printing in the normal intermittent mode without ending the paper feeding.

Figure 7:
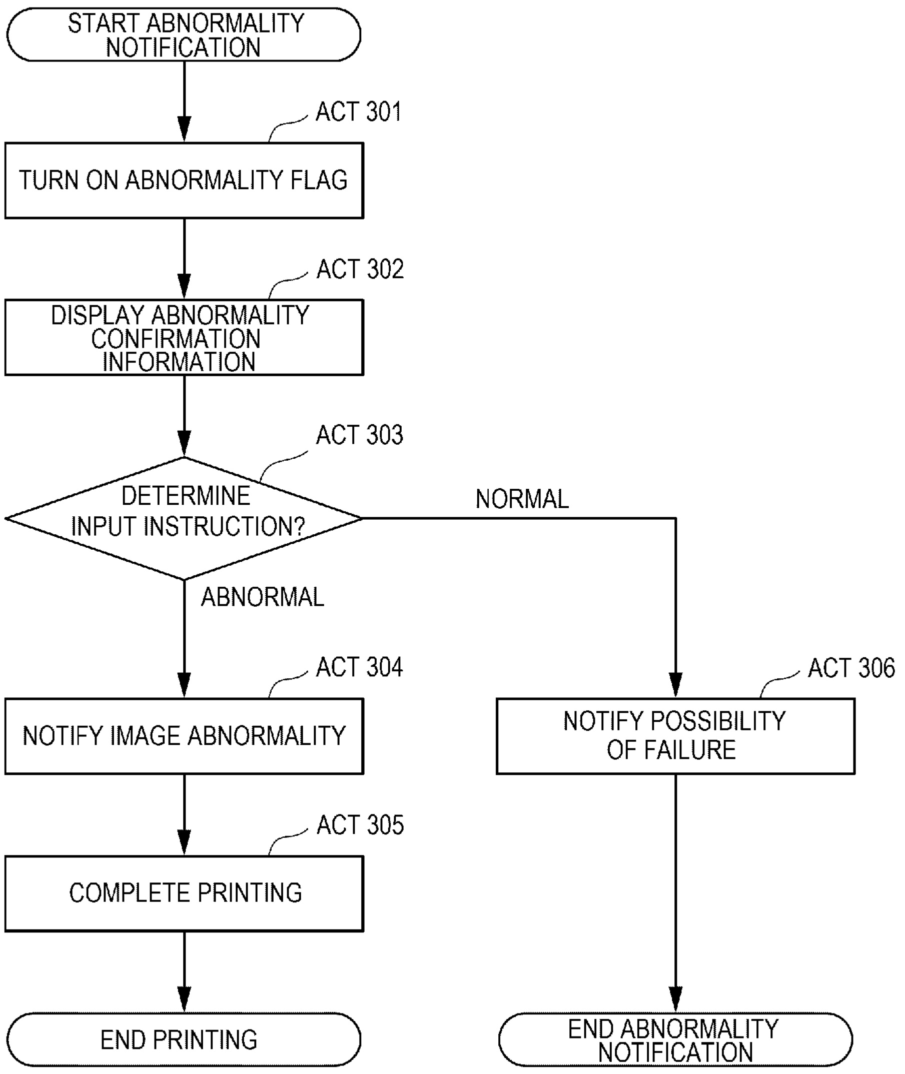
FIG. 7 is a flowchart showing a flow of abnormality notification (part 2) performed by the image forming apparatus.

FIG. 7 is a flowchart showing a flow of abnormality notification (part 2) performed by the image forming apparatus 1 in the embodiment.

The control unit 71 turns on the abnormality flag (ACT 301). The control unit 71 displays, on the control panel 110, abnormality confirmation information for prompting the user to confirm whether the image printed on the sheet S has an abnormality (ACT 302). The control unit 71 determines whether an input instruction input by the user is an instruction indicating that the image has an abnormality or an instruction indicating that the image has no abnormality (ACT 303).

When the control unit 71 determines that the input instruction input by the user is an instruction indicating that the image has an abnormality (ACT 303: abnormal), the control unit 71 notifies the service personnel via the network interface 130 that an image abnormality occurs (ACT 304). When the image abnormality occurs, it is difficult to continue the printing, and thus the control unit 71 ends the printing (ACT 305). That is, the control unit 71 ends the process instead of performing the processes of FIGS. 4 and 5.

When the control unit 71 determines that the input instruction input by the user is an instruction indicating that the image has no abnormality (ACT 303: not abnormal), the control unit 71 notifies the service personnel a possibility of other failures via the network interface 130 (ACT 306). It is possible to continue the printing since image abnormality does not occur. The control unit 71 executes the process of ACT 113 and the subsequent processes in FIG. 5.

The image forming apparatus 1 configured as described above stores one or more difference values each being a difference value between the first temperature T1 and the second temperature T2 when the condition for switching to the intermittent mode is satisfied. When the difference between each of the one or more stored difference values and the latest difference value obtained when the switching condition is newly satisfied is equal to or larger than the threshold, the image forming apparatus 1 turns on the abnormality flag indicating that the reference value for determining an abnormality is exceeded. As described above, in the image forming apparatus 1, it is possible to detect, based on the difference value, an abnormality or a possibility of abnormality in the apparatus.

A part of the functions of the image forming apparatus 1 according to the above-described embodiments may be implemented by a computer. In this case, programs for implementing the functions are recorded in a computer-readable recording medium. Then, the functions may be implemented by causing a computer system to read and execute a program recorded in the recording medium in which the above-described programs are recorded.

Here, the "computer system" includes an operating system and hardware such as a peripheral device. The "computer-readable recording medium" refers to a portable medium, a storage device, or the like. The portable medium is a flexible disk, a magneto-optical disk, a ROM, a CD-ROM, or the like. The storage device is a hard disk or the like built in a computer system. The "computer-readable recording medium" is a medium that dynamically stores a program for a short period of time, such as a communication line when the program is transmitted via the communication line. The communication line is a network such as the Internet, a telephone line, or the like. The "computer-readable recording medium" may be a volatile memory inside a computer system serving as a server or a client. The volatile memory stores a program for a certain period of time. The program may be a program for implementing a part of the above-described functions. The program may be a program capable of further implementing the above-described functions in combination with a program already recorded in the computer system.

While certain embodiments have been described, these embodiments have been presented by way of example only, and are not intended to limit the scope of the disclosure. Indeed, the novel embodiments described herein may be embodied in a variety of other forms: furthermore various omissions, substitutions and changes in the form of the embodiments described herein may be made without departing from the spirit of the disclosure. The accompanying claims and there equivalents are intended to cover such forms or modifications as would fall within the scope and spirit of the disclosure.

What is claimed is:

1. An image forming apparatus comprising:

an image forming unit configured to form an image on a sheet;

a fixer configured to fix the image formed on the sheet by pressing the image;

a first temperature sensor disposed in a first place away from the image forming unit and the fixer, and configured to measure an ambient temperature;

a second temperature sensor disposed in a second place closer to the image forming unit than to the first temperature sensor, and configured to measure an ambient temperature;

a storage configured to store one or more difference values, each difference value being a difference value between a first temperature and a second temperature, the first temperature measured by the first temperature sensor and the second temperature measured by the second temperature sensor, when a switching condition is satisfied for switching to an intermittent mode for intermittent printing in which printing stop and printing are repeated; and a controller configured to store information indicating that a reference value for determining an abnormality is exceeded, when a difference between (i) a statistical value of the one or more difference values stored in the storage and (ii) a latest difference value obtained when the switching condition is newly satisfied, is equal to or larger than a threshold.

2. The apparatus according to claim 1, wherein the second temperature sensor is configured to measure a temperature in a place closer to the fixer than the first temperature sensor.

3. The apparatus according to claim 1, further comprising:

a communication interface configured to communicate with an external device, wherein the controller is configured to notify the external device of a possibility of failure via the interface, when the information indicating that the reference value is exceeded is stored.

4. The apparatus according to claim 1, wherein when the information indicating that the reference value is exceeded is stored, the controller is configured to cause a display to display abnormality confirmation information for prompting a user to confirm whether the image fixed on the sheet has an abnormality.

5. The apparatus according to claim 3, wherein the controller is configured to control the image forming unit and the fixer to perform printing in the intermittent mode, after notifying the external device.

6. The apparatus according to claim 4, wherein the control is configured to stop printing by stopping operations of the image forming unit and the fixer, when an instruction indicating that the image fixed on the sheet has an abnormality is received.

7. The apparatus according to claim 6, further comprising:

a communication interface configured to communicate with an external device, wherein the controller is configured to notify the external device via the communication interface that an image abnormality occurs, when an instruction indicating that the image fixed on the sheet has an abnormality is received.

8. The apparatus according to claim 1, further comprising:

a communication interface configured to communicate with an external device, wherein the controller is configured to notify the external device of a possibility of failure via the communication interface, when an instruction indicating that the image fixed on the sheet has no abnormality is received.

9. The apparatus according to claim 1, wherein the first temperature sensor is disposed in a place where the first temperature sensor is less likely to be affected by heat during image formation than the second temperature sensor.

10. The apparatus according to claim 1, wherein the first temperature sensor is disposed within a housing of the image forming apparatus.

11. The apparatus according to claim 1, wherein the first temperature sensor is disposed in a vicinity of a sheet storage of the image forming apparatus.

12. The apparatus according to claim 1, wherein the second temperature sensor is disposed in a vicinity of a photosensitive drum of the image forming apparatus.

13. The apparatus according to claim 1, wherein the statistical value of the one or more difference values is an average value.

14. A method of operating an image forming apparatus, the image forming apparatus including an image forming unit configured to form an image on a sheet, a fixer configured to fix the image formed on the sheet by pressing the image, a first temperature sensor, and a second temperature sensor, the method comprising:

measuring an ambient temperature with the first temperature sensor, the first temperature sensor disposed in a first place away from the image forming unit and the fixer;

measuring an ambient temperature with the second temperature sensor, the second temperature sensor disposed in a second place closer to the image forming unit than to the first temperature sensor;

storing in a storage one or more difference values, each difference value being a difference value between a first temperature and a second temperature, the first temperature measured by the first temperature sensor and the second temperature measured by the second temperature sensor, when a switching condition is satisfied for switching to an intermittent mode for intermittent printing in which printing stop and printing are repeated; and storing information indicating that a reference value for determining an abnormality is exceeded, when a difference between (i) a statistical value of the one or more difference values stored in the storage and (ii) a latest difference value obtained when the switching condition is newly satisfied, is equal to or larger than a threshold.

15. The method according to claim 14, further comprising:

measuring, by the second temperature sensor, a temperature in a place closer to the fixer than the first temperature sensor.

16. The method according to claim 14, wherein the statistical value of the one or more difference values is an average value.

17. The method according to claim 14, further comprising:

notifying an external device of a possibility of failure when the information indicating that the reference value is exceeded is stored.

18. The method according to claim 14, further comprising:

displaying abnormality confirmation information for prompting a user to confirm whether the image fixed on the sheet has an abnormality when the information indicating that the reference value is exceeded is stored.

* * * * *